April 2, 1957 R. B. IDOINE 2,787,070
MAP HOLDER
Filed Sept. 7, 1954 2 Sheets-Sheet 1
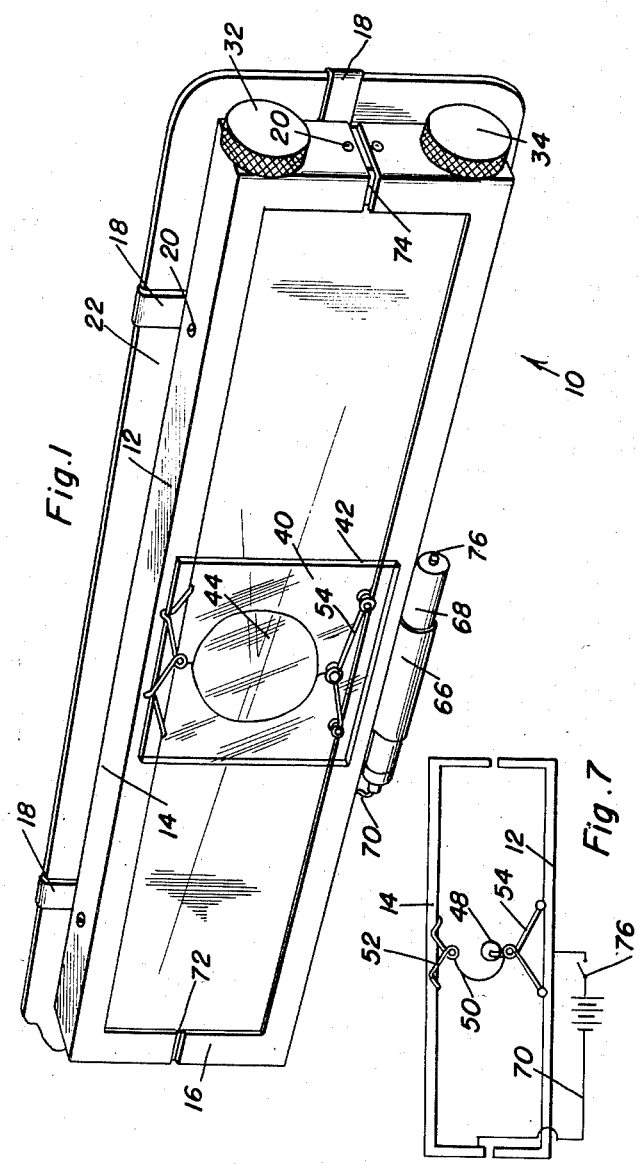
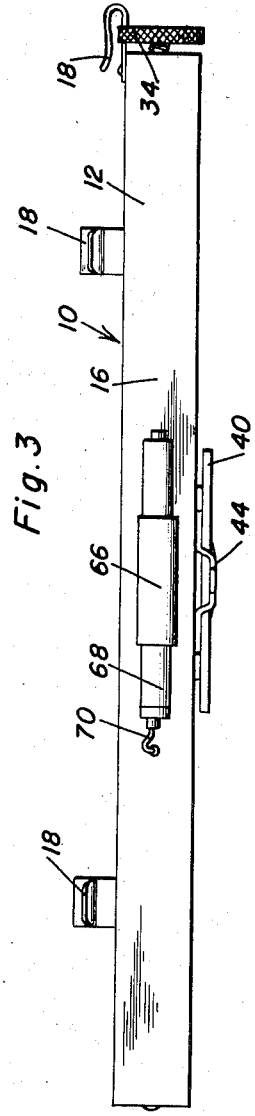
Robert B. Idoine
INVENTOR.
BY *Clarence A. O'Brien
and Harvey B. Jacobson*
Attorneys

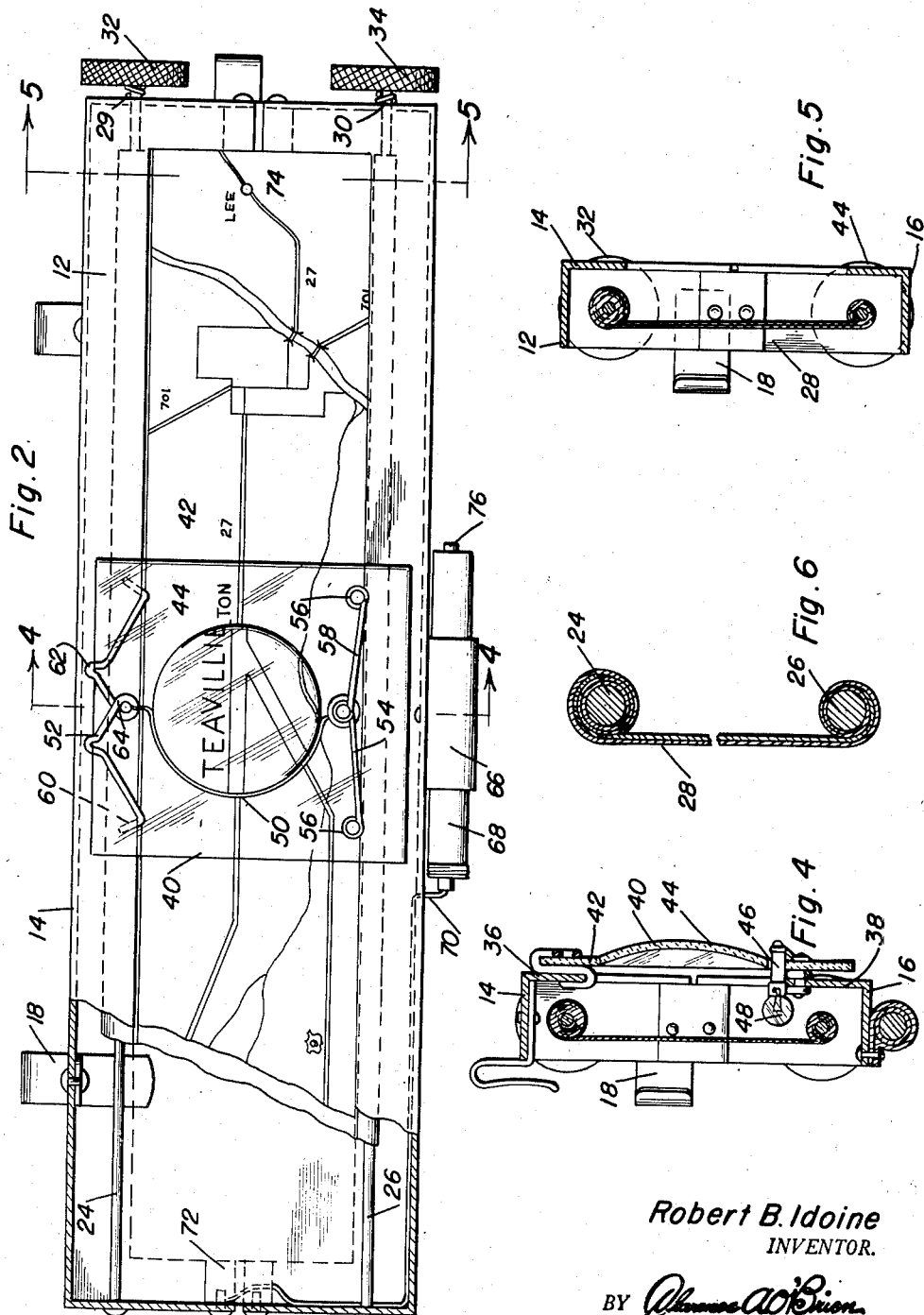

United States Patent Office 2,787,070
Patented Apr. 2, 1957

2,787,070

MAP HOLDER

Robert B. Idoine, Norwalk, Calif.

Application September 7, 1954, Serial No. 454,577

5 Claims. (Cl. 40—86)

This invention relates to an attachment for an automotive vehicle, and more particularly to a novel map holder adapted to be secured to a vehicle sun visor, or the like.

The primary object of the present invention resides in the provision of convenient means for supporting a road map or the like so that a motorist may clearly and easily determine the proper road or highway which he should traverse to arrive at his destination.

A further object of the invention resides in the provision of a map holder which includes means for not only magnifying the details of the road map but for illuminating the road map.

The construction of this invention features novel means for providing directed current to a lamp mounted on a block which is slidable along upper and lower frame sections with the frame sections themselves conducting current. Utilized as a source of electrical power are batteries, preferably of the flashlight type, which, while providing sufficient energy for illuminating the lamp, cannot cause uncomfortable shocks or the like.

Still further objects and features of this invention reside in the provision of a map holder that is strong and durable, simple in construction, easy to utilize, highly efficient in operation, and relatively inexpensive to manufacture, thereby permitting wide distribution and utilization.

These, together with the various ancillary objects and features of the invention which will become apparent as the following description proceeds, are attained by this map holder, a preferred embodiment of which has been illustrated in the accompanying drawings, by way of example only, wherein:

Figure 1 is a perspective view of the map holder comprising the present invention shown operatively installed on a vehicle sun visor;

Figure 2 is an enlarged plan view of the map holder with parts thereof being shown in section for greater detail;

Figure 3 is a bottom plan view of the map holder;

Figure 4 is a vertical sectional view as taken along the plane of line 4—4 in Figure 2 illustrating the construction of the block, lens, and lamp which forms the combined illuminating and magnifying member which is one of the important elements of the invention;

Figure 5 is a vertical sectional view as taken along the plane of line 5—5 in Figure 2;

Figure 6 is a sectional detail view illustrating the construction of the rollers and of the backing strip utilized in the invention; and Figure 7 is a schematic circuit diagram of the invention.

With continuing reference to the accompanying drawings, wherein like reference numerals designate similar parts throughout the various views, the reference numeral 10 generally designates the novel map holder comprising the present invention which is provided with a frame 12 including an upper frame member 14 and a lower frame member 16. Resilient clips as at 18 may be secured by any convenient manner such as screws 20 or the like to the casing 12 for securing the map holder 10 to a sun visor 22 of a vehicle or any other suitable structure.

The frame sections 14 and 16 are each of substantially U-shape to form a rectangular casing and are constructed from angle shaped material.

Rotatably mounted within the upper and lower frame sections 14 and 16, respectively, are rollers 24 and 26 which are maintained in their adjusted position by means of springs 28 and 30 and which may be rotated from one position to another by means of knobs 32 and 34 attached thereto outwardly of the frame 12. Secured to and entrained about the rollers 24 and 26 is a backing strip 28 formed of cloth or the like which is adapted to be wound upon the rollers 24 and 26. A road map is inserted into this map holder by folding the greater portion of the backing strip onto one of the rollers 24 or 26 and then inserting the map between the backing strip 28 and the other roller. The other of the rollers is then rotated, using one of the knobs 32 or 34 until the map is received on that roller and wound into position. Then, the map may be readily fed onto the other of the rollers and adjusted for the particular section corresponding to the highway over which the motorist wishes to travel.

Slidably engaging the opposed flange portions 36 and 38 of the frame sections 14 and 16 is a combined illuminating and magnifying member 40 for magnifying the indicia on the map and for illuminating the map. This member 40 includes a block 42 formed from a suitable, preferably transparent material such as any of the conventional synthetic plastics, and has a lens 44 cast or embedded therein. The lens 44 is adapted to magnify the indicia on the map.

Carried by the block 42 is a lamp socket 46 in which a bulb 48 is positioned. Conductors 50 are connected to the lamp socket for supplying electrical energy to the lamp 48. The conductors 50 are connected to a substantially inverted W-shaped clip 52 and a roller assembly 54, both of which are carried by the block 42.

The roller assembly 54 is secured to the block 42 and includes spring-pressed rollers 56 mounted on the ends of an eye spring 58 so as to be resiliently urged into engagement with the flange 38. The W-shaped spring 52 has inner portions 60 engaged inwardly of the flange 36 and outer portions 62 engaging the outer surface of the flange 36. A loop 64 is provided for the W-shaped spring 52 and is adapted to be engaged so as to enable the removal of the W-shaped spring 52 and hence of the illuminating and magnifying member 40 when such is desired. The spring 52 and the roller assembly 54 therefore provide a slidable mounting for the block 42.

Attached to the lower frame member 16 by means of a preferably cylindrical bracket 66 is a container 68 for flashlight batteries. The batteries are grounded to the casing or container 68 which in turn is grounded through the bracket 66 to the lower frame member 16. The batteries are further conducted at their positive terminals by means of a conductor 70 which extends through an insulative block 72 provided for joining the upper and lower frame sections 14 and 16 in a manner where the frame sections are insulated from each other. The conductor 70 is connected to the frame member 14. An insulative block 74 is provided at the other end of the frame 12 for insulating the upper and lower frame members 14 and 16 from each other.

After the map has been installed in the map holder, a switch 76 located in any convenient portion of the circuit of this map holder is closed, completing an operative electrical circuit between the batteries within the casing 68 to the lamp 48 through the conductor 70 through the upper frame section 14, through the W-shaped clip 52, and through the conductors 50 and lamp socket 46, through the spring assembly 54, to the lower frame section 16 and ground. Therefore, the motorist may read through the lens 44 a magnified and illuminated representation of the road over which he is travelling, thereby enabling the motorist to safely and with assurance complete his trip.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A map holder comprising a frame comprising a pair of electrically conductive frame sections insulated from and attached to each other, rollers rotatably mounted in said frame sections, a backing strip entrained about said rollers and adapted to receive and wind therein a road map, a combined illuminating and magnifying member slidably mounted on said frame and engaging said frame sections, and a source of electrical energy connected to said frame sections, said member including an insulative block having a lens therein, a lamp carried by said block, contact means engaging said frame sections, and a conductor electrically interconnecting said contact means with said lamp, said contact means including rollers mounted on said block and engaging one of said frame sections.

2. A map holder comprising a frame comprising a pair of electrically conductive frame sections insulated from and attached to each other, rollers rotatably mounted in said frame sections, a backing strip entrained about said rollers and adapted to receive and wind therein a road map, a combined illuminating and magnifying member slidably mounted on said frame and engaging said frame sections, and a source of electrical energy connected to said frame sections, said member including an insulative block having a lens therein, a lamp carried by said block, contact means engaging said frame sections, and a conductor electrically interconnecting said contact means with said lamp, said contact means comprising an inverted W-shaped spring resiliently engaging said block and one of said frame sections detachably securing said block to said one of said frame sections.

3. A map holder comprising a frame comprising a pair of electrically conductive frame sections insulated from and attached to each other, rollers rotatably mounted in said frame sections, a backing strip entrained about said rollers and adapted to receive and wind therein a road map, a combined illuminating and magnifying member slidably mounted on said frame and engaging said frame sections, and a source of electrical energy connected to said frame sections, said member including an insulative block having a lens therein, a lamp carried by said block, contact means engaging said frame sections, and a conductor electrically interconnecting said contact means with said lamp, said contact means comprising an inverted W-shaped spring resiliently engaging said block and one of said frame sections detachably securing said block to said one of said frame sections, said contact means further including rollers mounted on said block and engaging the other of said frame sections.

4. A map holder comprising a frame comprising a pair of electrically conductive frame sections insulated from and attached to each other, rollers rotatably mounted in said frame sections, a backing strip entrained about said rollers and adapted to receive and wind therein a road map, a combined illuminating and magnifying member slidably mounted on said frame and engaging said frame sections, and a source of electrical energy connected to said frame sections, said source of electrical energy comprising a casing having batteries mounted therein, said batteries being grounded to said casing, said casing being grounded to one of said frame sections, said batteries being connected to the other of said frame sections.

5. A map holder comprising a frame comprising a pair of electrically conductive frame sections insulated from and attached to each other, rollers rotatably mounted in said frame sections, a backing strip entrained about said rollers and adapted to receive and wind therein a road map, a combined illuminating and magnifying member slidably mounted on said frame and engaging said frame sections, and a source of electrical energy connected to said frame sections, said member including an insulative block having a lens therein, a lamp carried by said block, contact means engaging said frame sections, and a conductor electrically interconnecting said contact means with said lamp, said contact means comprising an inverted W-shaped spring resiliently engaging said block and one of said frame sections detachably securing said block to said one of said frame sections, said contact means further including rollers mounted on said block and engaging the other of said frame sections, said source of electrical energy including a casing having batteries mounted therein grounded to said casing, said casing being grounded to said other of said frame sections, said batteries being connected to said one of said frame sections.

References Cited in the file of this patent

UNITED STATES PATENTS

| 2,056,693 | Stanley | Oct. 6, 1936 |
| 2,501,840 | Bradford | Mar. 28, 1950 |

FOREIGN PATENTS

| 158,884 | Austria | Mar. 18, 1905 |
| 866,009 | France | Mar. 24, 1941 |